United States Patent Office 3,751,553
Patented Aug. 7, 1973

3,751,553
PROCESS FOR SEPARATING YTTRIUM VALUES FROM THE LANTHANIDES
Bjorn Gaudernack, Oslo, and Gunnar Hannestad and Ingleiv Hundere, Skedsmokorset, Norway, assignors to Forskningsgruppe for Sjeldna Jordarter
No Drawing. Filed Sept. 13, 1971, Ser. No. 180,097
Claims priority, application Norway, July 20, 1971, 2,750/71
Int. Cl. C22b 59/00
U.S. Cl. 423—21
8 Claims

ABSTRACT OF THE DISCLOSURE

An improved liquid-liquid extraction process for the separation of yttrium values from the elements of the lanthanide series and other impurities is disclosed. The light lanthanide elements are separated by extraction from an aqueous nitrate solution with an organic solution of a quaternary ammonium nitrate, and the heavy lanthanides are subsequently removed from the aqueous solution by extraction with an organic solution of a quaternary ammonium thiocyanate.

---

This invention relates to liquid-liquid extraction methods of recovering rare earth elements from aqueous solutions and separating them from each other, and more particularly is concerned with an improved extraction process for the production of highly purified yttrium compounds.

As used herein, the term rare earth elements includes yttrium as well as the elements of the lanthanide series having atomic numbers from 57 through 71. These elements occur together in nature and have highly similar chemical properties, making it very difficult to separate and purify the individual elements by conventional techniques.

There has been a significant increase in the uses and demands for rare earth compounds in recent years. In particular, highly purified yttrium compounds, e.g., yttrium oxide, find extensive use in phosphors for color television tubes and lighting products, and increasing application in electronics and related equipment. Furthermore, there are indications of increasing markets for less purified yttrium compounds, such as yttrium oxide of around 90% purity, provided that sufficiently cheap and convenient methods of producing such compounds are available.

It is known that separation processes based on ion exchange chromatography yield high-purity compounds of the individual rare earth elements. Such methods are, however, inherently expensive and quite time-consuming. Methods based on liquid-liquid extraction have been developed and used for separation of rare earth elements.

Inherent disadvantages in the known methods for liquid-liquid extraction are: high consumption of chemicals in either the extraction or re-extraction steps, necessity of operating at temperatures other than ambient, or with partial or total reflux (batch-wise).

Separation of rare earth elements by liquid-liquid extraction using quaternary ammonium compounds has been described (Bauer, Lindstrom, 7th Rare Earth Research Conference, Coronado, Calif., vol. 1, pp. 413–423). U.S. Pat. 3,294,494 teaches that actinide and lanthanide elements can be recovered from aqueous solutions and separated from each other by extraction with an organic solution of a quaternary ammonium nitrate. It is stated that yttrium and lanthanide elements having atomic numbers from 64 (Gd) to 71 (Lu) can be separated from lanthanides having atomic numbers of 57 (La) to 63 (Eu) by the process according to the invention. The purity of the yttrium in such an extraction is, however, unacceptable.

It is an object of the present invention to provide a simple, one-step continuous liquid-liquid extraction process for separating yttrium from the lanthanide elements to a degree of purity corresponding to about 90% yttrium oxide.

It is another object of the invention to provide an improved liquid-liquid extraction process for the production of yttrium compounds of very high purity.

According to the invention, a method is provided for the separation of yttrium from lanthanide elements in an aqueous solution, containing nitrate as the predominant anion. The process comprises contacting the aqueous solution with an organic solution of a quaternary ammonium nitrate, separating the resulting organic and aqueous solutions from each other and subjecting them to individual treatment. By this procedure the conditions are so adjusted that the majority of the lanthanide elements are extracted into the organic phase, leaving yttrium and the heaviest lanthanides in the aqueous solution. Final separation of yttrium from the remaining lanthanides is achieved by subjecting the aqueous solution to a second extraction step in which the heavy lanthanides are extracted preferentially to yttrium. An organic solution of a quaternary ammonium thiocyanate in a suitable concentration is the preferred extractant in this step, although other extractants selected from the groups or organophosphorous or organic nitrogen-containing compounds may be employed, in the presence of thiocyanate. In addition to separation from the heavy lanthanides, efficient removal of certain common impurities, notably ferric iron, is achieved in this extraction step. It is absolutely essential that the process be carried out in the stated order, i.e., the extraction with nitrate must be done first followed by the extraction with the thiocyanate. It is thought that the reason for this is that the thiocyanate interferes with the nitrate separation. This has been confirmed by the fact that a reversal of the steps will give a good result if there is an additional step of decomposition of the thiocyanate before carrying out the nitrate extraction. Therefore, it is seen that the process can be either a two-step process of nitrate extraction followed by thiocyanate extraction or it can be a three-step process of thiocyanate extraction followed by elimination of the thiocyanate by neutralization, decomposition or other removal and then nitrate extraction.

Other common impurities, such as alkaline earth or alkali metal impurities that may be introduced with the raw material or the process chemicals employed, may be separated by subjecting the yttrium-containing aqueous solution from the previous steps to a final extraction step in which yttrium is preferentially extracted, leaving the impurities in the aqueous solution. The yttrium values are subsequently recovered from the organic phase by re-extraction with pure water or with a pure aqueous solution of a suitable mineral acid. The preferred extractant for the final extraction step is again an organic solution of a quaternary ammonium compound in a suitable concentration, although alternative extractants may be employed as in the second extraction step.

In carrying out the first step of our process, an acidic aqueous solution of the rare earth elements in which nitrate is the predominant anion is contacted with an organic solution of a quaternary ammonium nitrate. Commercially available quaternary ammonium compounds are normally in the chloride form, but conversion to nitrate is easily achieved by contacting the organic solution with an aqueous nitrate solution, e.g., an ammonium nitrate solution. Any quaternary ammonium compound with a low solubility in the aqueous phase and a sufficiently high solubility in the employed organic solvent can be used. Generally these requirements are met when the molecular weight of the compound is in the range of 300–600. Preferred as extractants are compounds of the type:

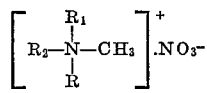

wherein A represents the anion and $R_1$–$R_3$ are saturated hydrocarbon chains with 8–12 carbon atoms. Mixtures of such compounds having predominantly $C_8$–$C_{10}$ chains and molecular weights of 430–440 are commercially available.

Any liquid organic compound or mixture that will dissolve the quaternary ammonium compound and the metal complexes to be extracted can be used as the organic solvent, provided that it is essentially water immiscible and does not interfere unfavorably with the extraction process. Examples of suitable extractant diluents are aromatic solvents such as benzene, xylene, toluene or aromatic petroleum fractions; aliphatic petroleum fractions (kerosene); alcohols, ketones, etc.

Extraction of the rare earth elements increases with increasing concentration of the quaternary ammonium salt in the organic phase, and with increasing nitrate concentration in the aqueous phase. Practical upper limits to these concentrations are set by solubilities, and the requirements to density difference and limited viscosity for satisfactory phase separation. In our process, the extractant concentration in the organic phase and the nitrate concentration in the aqueous phase are selected to give maximum extraction of the lanthanides, without extracting significant amounts of yttrium. The concentration of the quaternary ammonium nitrate in the organic phase usually ranges from 100–600 grams per liter, with the preferred range being from 300–500 grams per liter. The nitrate concentration in the aqueous phase usually ranges from 3–8 moles per liter, and is preferably in the range of 5–7 moles per liter. This refers to the total nitrate concentration in the aqueous phase. Since the concentration of rare earth nitrates is preferably about 0.5 molar or less, this means that a suitable nitrate salt must be added to the aqueous solution to bring the total nitrate concentration to the desired value. Nitrate salts having high aqueous solubilities, such as aluminum nitrate, alkali metal and ammonium nitrates, may be used for this purpose. Ammonium nitrate is the preferred salt since an introduction of large amounts of foreign metal ions is usually undesirable.

The acidity of the aqueous phase should preferably be in the range of pH=0.5–5. Extractability increases with increasing pH whereas separation is somewhat better at low pH values. Upper and lower limits of the pH range are usually set by hydrolysis of the metals in solution and by insufficient extractability, respectively.

We have discovered that by extracting rare earth elements from aqueous nitrate solutions with an organic solution of a quaternary ammonium nitrate, under conditions as described above we can remove essentially all lanthanides with an atomic number less than 69 and yttrium of about 90% purity can be produced, since the heavy lanthanides reporting with yttrium in the aqueous solution (Tm, Yb, Lu) amount to about 10% of the yttrium content in most of the naturally occurring raw materials. While it is known that the extraction behavior of yttrium is similar to that of some of the heavier lanthanides in certain other extraction systems, e.g., it behaves as if it had an atomic number of 67.5 (between Ho and Er) by extraction with di(2-ethyl-hexyl) phosphoric acid (D2EHPA), we have found that yttrium behaves like a lanthanide of as high an atomic number as 70 (Yb) in our process. This is extremely important from a commercial point of view since it indicates for the first time 90% pure yttrium oxide can be produced from any natural raw material in a relatively simple and inexpensive one-step process. In addition, the extracted lanthanide elements may be stripped easily from the organic phase with water or dilute mineral acid and may be recovered by precipitation from the strip solution.

We have found that in an extraction system consisting of an aqueous nitrate solution of rare earth elements and an organic solution of a quaternary ammonium thiocyanate, conditions may be so adjusted that all lanthanides having atomic numbers larger than 60 can be separated from yttrium. Since separation of yttrium from all lanthanides with atomic numbers lower than 69 may be achieved by extraction with a quaternary ammonium nitrate as described above, highly effective separation of yttrium from all elements of the lanthanide series can be achieved by combining the two systems described in a two-step, liquid-liquid extraction process. The order in which the two steps are carried out is extremely important. The preferred order is to extract first with the quaternary ammonium nitrate and then subject the aqueous raffinate from this step to extraction with the quaternary ammonium thiocyanate. This results in a particularly simple manner of operation, since no auxiliary process step is required between the two extraction steps. If the order of the extraction steps is reversed, it is absolutely essential that the thiocyanate present in the aqueous phase be removed prior to the quaternary ammonium nitrate extraction, as we have discovered that the thiocyanate has a deleterious effect on the separation obtainable in this extraction step.

In order to reduce or eliminate the net transfer of thiocyanate from the organic to the aqueous phase that takes place upon contacting an organic solution of a quaternary ammonium thiocyanate with an aqueous nitrate solution, some thiocyanate is preferably added to the aqueous solution prior to contacting it with the extractant. This is not required for obtaining the necessary separation, however. Any easily soluble thiocyanate salt may suitably be added to the aqueous nitrate solution. Ammonium thiocyanate is preferred in order to avoid addition of metal ions.

The pH of the aqueous solution may suitably be in the range of 0.5–5, being limited by the same factors as described for the quaternary ammonium nitrate extraction system. The aqueous nitrate concentration is preferably in the range of 1.5–6 molar. Distribution ratios of the rare earth elements increase with increasing concentrations of nitrate and thiocyanate in the aqueous phase and of quaternary ammonium thiocyanate in the organic phase, whereas these parameters may be varied within relatively wide limits without affecting the separation factors.

In our preferred process, the aqueous raffinate from the quaternary ammonium nitrate extraction is subjected to extraction by the quaternary ammonium thiocyanate without adjustment of its nitrate or rare earth element concentrations. The concentration of quaternary ammonium thiocyanate in the organic phase is selected to give suitable distribution ratios, so that the heavy lanthanides are quantitatively extracted, whereas yttrium is left in the aqueous phase. The concentration of extractant in the organic phase usually ranges from 100–600 grams per liter, the preferred range being from 200–500 grams per liter. The quaternary ammonium compound to be employed as extractant and the organic solvent are selected using the same criteria as described with respect to the quaternary ammonium nitrate extraction step. It is of obvious advantage to use the same quaternary ammonium compound and the same organic solvent in both extraction steps. Conversion of a quaternary ammonium compound in a commercially available form, such as a chloride, to the thiocyanate form may be accomplished by contacting the organic solution with an aqueous thiocyanate solution, e.g., an ammonium thiocyanate solution.

It is a great advantage of our process that all the lanthanide elements are removed in the two extraction steps as described, whereas the yttrium remains in the aqueous solution throughout the process. The yttrium may be recovered from this solution by precipitation, e.g., as the hydroxide or the oxalate. The aqueous solution may, however, contain certain metal ions which have been introduced with the raw material or the chemicals employed, and which are not easily separated from yttrium by precipitation or other conventional techniques. Examples of such impurities are the alkali and alkaline earth metals, calcium being of particular importance. To ensure complete separation from such impurities, a third extraction step may conveniently be employed. In this step yttrium is selectively extracted with a suitable organic extractant, leaving the impurities in the aqueous solution. Yttrium is subsequently re-extracted with pure water or a pure, dilute mineral acid and recovered from the strip solution by precipitation, e.g., as the hydroxide or the oxalate.

Any organic extractant with sufficient selectivity for yttrium may be used in this final extraction step. Since an organic solution of a quaternary ammonium compound as employed in the previous extraction steps is perfectly adequate for the purpose, it is of obvious advantage to use such a solution. In our preferred process the aqueous solution after the lanthanide extraction steps is subjected to extraction with an organic solution of a quaternary ammonium thiocyanate, the concentration of the latter being adjusted for complete extraction of the yttrium, leaving the metal impurities in the aqueous phase. In the aqueous raffinate from the lanthanide extraction steps the nitrate and thiocyanate concentrations are typically from 2–4 molar and from 0.1–0.3 molar, respectively. Quantitative yttrium extraction and separation from impurities may then be accomplished by extraction with an organic solution containing from 300–500 grams per liter of a quaternary ammonium thiocyanate. The quaternary ammonium compound and the organic solvent employed are preferably the same as in the lanthanide extraction steps.

It may be of advantage in some cases to subject a material containing rare earth elements to a preliminary extraction step with another extracting agent before the extraction with quaternary ammonium compounds according to the invention is carried out. Such cases may occur when the material contains components that preferably should be removed before the separation process takes place. Sometimes it may also be desirable to remove one or more members of the lanthanide series through such a pre-extraction.

The most important advantages offered by our process are: its ability to produce relatively high-grade (ca. 90%) yttrium compounds by a simple, one-step liquid-liquid extraction, to provide complete separation of yttrium from all lanthanide elements by adding a second extraction step, and to separate yttrium from other impurities to a very high degree of purity by means of a third extraction step. Other advantages follow from the ease of carrying out the entire process in a completely continuous manner, using basically the same extracting agent in all the extraction steps, inasmuch as only the concentrations and anionic forms of the extractant are varied. The process may be carried out at ambient temperature and does not involve a large usage of chemicals. All back extractions are accomplished by means of water or very dilute mineral acids. The salting and complexing agents required, i.e., nitrate and thiocyanate salts, may easily be recovered from the aqueous effluents and reused in the process. Recovery may be accomplished through auxiliary liquid-liquid extraction steps or by conventional techniques, such as evaporation.

Since all process steps are carried out at low acidities and nitrate is the predominant anion in the aqueous solutions, the process is very favorable with respect to corrosion of equipment. The process thus offers considerable technical improvements as compared to existing liquid-liquid extraction methods for yttrium separation.

Some important features of the process are illustrated in more detail in the following examples:

EXAMPLE 1

The example shows how a mixture of rare earth elements derived from the mineral gadolinite, which is rich in yttrium and the heavy lanthanides, can be fractioned into a yttrium fraction of >90% purity and a fraction containing the majority of the lanthanides through extraction with a quaternary ammonium nitrate.

The extracting agent used was 40 weight percent "Aliquat 336" (a commercial product from General Mills Inc., U.S.A., consisting of tricapryl-methyl-ammonium chloride) dissolved in "Solvesso 100" (an aromatic petroleum fraction available from Esso). The extractant was converted to the nitrate form by contacting the organic solution with an aqueous 1 molar solution of ammonium nitrate in an 8-stage mixer-settler apparatus.

The aqueous feed solution was made by dissolving the mixture of rare earth elements in nitric acid and adjusting the ammonium nitrate concentration to 6.5 molar and the pH to 3. The concentrations of rare earth elements were as follows:

TABLE 1

| Element: | Cons. g./l. |
|---|---|
| La | 0.05 |
| Ce | 0.22 |
| Pr | 0.07 |
| Nd | 0.40 |
| Sm | 0.28 |
| Gd | 0.43 |
| Tb | 0.05 |
| Dy | 0.74 |
| Ho | 0.15 |
| Er | 0.49 |
| Yb | 0.51 |
| Y | 8.2 |

53 liters of the feed solution were contacted countercurrently with the extractant in a 28-stage mixer-settler assembly, consisting of 25 extraction stages and 3 scrub stages. An aqueous 2 molar $NH_4NO_3$ solution was used as the scrub solution. Flow rates for feed solution, extractant and scrub solution were 1 liter per hour, 2 liters per hour, and 0.5 liter per hour, respectively. The organic phase leaving the scrub section was collected and subjected to back extraction by 3 batch contacts with 0.001 molar $HNO_3$. After a single equilibration with a solution of 1 molar $NH_4NO_3$ in water, the organic phase was recirculated to the extraction section.

By steady state conditions in the mixer-settler the recovery of yttrium in the raffinate was better than 99%. This raffinate was collected, and its content of rare earth elements precipitated as hydroxides and re-dissolved in $HNO_3$. The procedure resulted in a Product Solution containing 6.6 grams per liter of Y, 0.41 gram per liter of Yb, and 0.03 gram per liter of Er. Upon precipitation with oxalic acid followed by calcination an oxide product with the following composition was obtained:

| | Percent |
|---|---|
| $Y_2O_3$ | 93.5 |
| $Yb_2O_3$ | 5.9 |
| $Er_2O_3$ | 0.4 |

Rare earth elements other than these were below the limit of detection of the method of analysis used (X-ray fluorescence spectrometry).

EXAMPLE 2

This example illustrates how yttrium can be separated from a fractional product containing yttrium and heavy lanthanides by extraction with a quaternary ammonium thiocyanate. The extracting agent employed was a solution containing 40 weight percent "Aliquat 336" dissolved in "Solvesso 100." The commercial quaternary ammonium compound had been converted to the thiocyanate form through continuous counter-current extraction with an aqueous 1 molar NH$_4$SCN solution in an 8-stage mixer-settler.

Product solution from the fractionation procedure described in Example 1 was used as feed solution. This contained 6.6 grams per liter of Y, 0.41 grams per liter of Yb, and 0.03 gram per liter of Er. The solution had a pH of 3, and the concentration of NH$_4$NO$_3$ was 2.65 molar. 50 liter of the feed solution were contacted counter-currently with the extractant in a 20-stage mixer-settler of which 17 stages were used for extraction and 3 stages for scrubbing. The scrub solution was 0.85 molar NH$_4$NO$_3$ in water. The organic phase leaving the scrub section was transferred to an 8-stage mixer-settler for continuous back extraction with 0.001 molar HNO$_3$. After a single batch-wise contact with an aqueous 1 molar NH$_4$SCN solution the organic phase was then re-circulated to the extraction section. The flow rates for the feed solution, extractant, scrub solution and strip solution were 1 liter per hour, 1.5 liters per hour, 0.55 liter per hour, and 1.5 liters per hour, respectively.

By steady-state extraction conditions the recovery of yttrium in the raffinate was better than 99%. Y was precipitated from the raffinate as the oxalate, dried and ignited at 900° C. The resulting Y$_2$O$_3$ product was analyzed by X-ray fluorescence spectrometry. The analysis showed 0.003% of Er$_2$O$_3$, all other lanthanide elements being below the limit of detection. The separated Y$_2$O$_3$ therefore had a nominal purity of 99.997% with respect to other rare earth elements.

EXAMPLE 3

The example illustrates the upgrading of an yttrium fraction from about 70% to more than 90% Y$_2$O$_3$ by extraction with a quaternary ammonium nitrate.

The extractant used was 40 weight percent "Adogen 464" (a commercial tricapryl-methyl-ammonium chloride from Ashland Chemical Corp.), dissolved in "Solvesso 150" (an aromatic solvent available from Esso). The extractant was converted to the nitrate form by contacting the organic solution with an aqueous 1 molar ammonium nitrate solution in an 8-stage mixer-settler battery.

The aqueous feed solution was prepared by dissolution of xenotime, a rare earth phosphate rich in yttrium, followed by fractionation and conversion to nitrates in a D2EHPA extraction step. The nitrate concentration was adjusted to 6.6 molar by addition of ammonium nitrate, and the pH of the solution was adjusted to 3. The concentrations of rare earth elements were as follows:

TABLE 2

| Element: | G./l. |
|---|---|
| Gd | 0.05 |
| Tb | 0.14 |
| Dy | 2.61 |
| Ho | 0.46 |
| Er | 1.85 |
| Yb | 0.93 |
| Y | 16.75 |

150 liters of the feed solution were contacted in counter-current with the extractant in a mixer-settler battery consisting of 26 extraction and 6 scrub stages. An aqueous 1.75 molar NH$_4$NO$_3$ solution of pH 3 was used as scrub solution. The organic extract was stripped with dilute nitric acid and re-equilibrated with an aqueous NH$_4$NO$_3$ solution as described in Example 1. The flow rates were also equal to those given in Example 1.

By steady state conditions in the mixer-settlers the yttrium recovery in the raffinate was 98%. The analysis of the raffinate was as follows:

TABLE 3

| Element: | G./l. |
|---|---|
| Gd | <0.01 |
| Tb | <0.01 |
| Dy | <0.01 |
| Ho | <0.01 |
| Er | <0.01 |
| Yb | 0.58 |
| Y | 10.10 |
| NO$_3^-$(M) | 4.9 |
| pH | 3 |

Thus, the purity of yttrium with respect to lanthanides in this solution was about 95%.

EXAMPLE 4

Further upgrading of the yttrium solution obtained as described in Example 3 was accomplished by extracting the remaining lanthanides with a quaternary ammonium thiocyanate. The extractant used was 40% "Adogen 464" in "Solvesso 150," converted to the thiocyanate form as described in Example 2. The scrub solution was an aqueous, 0.5 molar NH$_4$NO$_3$, 0.1 molar NH$_4$SCN solution of pH3. The feed solution was also made 0.1 molar in ammonium thiocyanate prior to the extraction, which was carried out counter-currently in a 32-stage mixer-settler (26 extraction+6 scrub stages). The flow rates for extractant, feed and scrub solutions were 1.75 liters per hour, 1.0 liter per hour and 0.5 liter per hour, respectively.

A yttrium recovery of 99% in the raffinate was obtained at steady state. Yttrium was precipitated from the raffinate as the oxalate, dried and calcined at 950° C. The resulting yttrium oxide was analyzed by mass spectrometry using an isotope dilution technique. The analysis indicated less than 1 part per million of all lanthanide except ytterbium, which was present in a concentration of 4 parts per million. The nominal purity of the Y$_2$O$_3$ product was thus 99.9995% with respect to other rare earths.

EXAMPLE 5

The purification from calcium described in this example illustrates the final separation from impurities remaining after the lanthanide extractions. The yttrium oxide of Example 4 containing 150 parts per million of calcium, was dissolved in nitric acid. A solution was prepared containing 7.15 grams per liter of yttrium, 4.4 molar NH$_4$NO$_3$, 0.2 molar NH$_4$SCN and a pH of 3. The yttrium was extracted from this solution with 98% recovery by contacting it with a 45 weight percent solution of "Adogen 464" (thiocyanate form, in "Solvesso 150") in a 10-stage mixer-settler battery. The yttrium was subsequently stripped from the extract with highly purified water in a 6-stage mixer-settler. The flow rates for extractant, feed and strip solutions were 1 liter per hour, 2.5 liters per hour and 0.5 liter per hour, respectively.

Yttrium was precipitated from the strip solution as the oxalate, dried and calcined at 950° C. The calcium content in the final Y$_2$O$_3$ product was 15 parts per million.

This example illustrates that it is not feasible to carry

EXAMPLE 6

This example illustrates that it is not feasible to carry out the step of thiocyanate extraction first followed by the nitrate extraction.

The extracting agent used first was 40 weight percent of "Aliquat 336" dissolved in "Solvesso 100." The commercial quaternary ammonium compound had been converted to the thiocyanate form through continuous counter-current extraction with an aqueous 1 molar NH$_4$SCN solution in an 8-stage mixer-settler. The mixture of rare earth elements, derived from the mineral gadolinite was dissolved in nitric acid after which the ammonium nitrate concentration was adjusted to 2.6 molar and the pH to 3. The concentrations of rare earth elements were as given in Table 1 of Example 1. 50 liters of the feed solution were contacted counter-currently with the thiocyanate extractant in a 20-stage mixer-settler of which 17 stages were used for extraction and 3 stages for scrubbing. The scrub solution was 0.85 molar $NH_4NO_3$ in water. The organic phase leaving the scrub section was transferred to an 8-stage mixer-settler for continuous back extraction with 0.001 molar $HNO_3$. After a single batch-wise contact with an aqueous 1 molar $HN_4SCN$ solution the organic phase was then re-circulated to the extraction section. The flow rates for the feed solution, extractant, scrub solution, and strip solution were 1 liter per hour, 1.5 liters per hour, 0.55 liter per hour, and 1.5 liters per hour, respectively.

The resulting Product Solution contained the following rare earth elements:

TABLE 4

| Element: | G./l. |
|---|---|
| La | 0.03 |
| Ce | 0.14 |
| Pr | 0.04 |
| Nd | 0.13 |
| Sm | 0.05 |
| Gd | 0.03 |
| Y | 5.1 |

Other lanthanide concentrations were below the detection limit of about 0.01 g./l.

This Product Solution was then made 6.5 molar in ammonium nitrate and subjected to extraction with a quaternary ammonium nitrate. The quaternary ammonium nitrate was prepared by dissolving 40 weight percent of "Adogen 464" in "Solvesso 150" and converting it to the nitrate form by contacting the organic solution with an aqueous 1 molar nitrate solution in an 8-stage mixer-settler battery.

50 liters of the Product Solution were contacted in counter-current with the extractant in a mixer-settler battery consisting of 26 extraction and 6 scrub stages. An aqueous 1.75 molar $NH_4NO_3$ solution of pH 3 was used as scrub solution. The organic extract was stripped with dilute nitric acid and re-equilibrated with an aqueous $NH_4NO_3$ solution as described in Example 1. The flow rates were also equal to those given in Example 1.

By steady state conditions in the mixer-settlers the yttrium recovery in the raffinate was 99 percent. The analysis of the raffinate was as follows:

TABLE 5

| Element: | G./l. |
|---|---|
| La | 0.02 |
| Ce | 0.01 |
| Pr | 0.02 |
| Nd | 0.02 |
| Y | 3.4 |

Other lanthanide concentrations were below the detection limit of about 0.01 g./l.

The purity of yttrium with respect to the lanthanides in this solution was only 95.5 percent which is not suitable. It is thus seen that it is not feasible to have a two-step extraction process of thiocyanate extraction followed by nitrate extraction.

EXAMPLE 7

This sample illustrates that yttrium can be purified by a three-step process of thiocyanate extraction followed by destruction or removal of the thiocyanate and then quaternary ammonium nitrate extraction.

The process conditions of Example 6 were repeated. However, in this case an additional step was carried out between the thiocyanate extraction and the nitrate extraction. 50 liters of the Product Solution of the thiocyanate extraction were treated with 5 liters of 14 molar $HNO_3$, a product which is capable of decomposing the thiocyanate. Other suitable reagents include other strong acids such as HCl and $H_2SO_4$ or oxidizing agents, such as hydrogen peroxide. The thiocyanate could also be removed by anion exchange or by precipitation, e.g. as AgSCN or CuSCN. Alternatively, separation from thiocyanate could be achieved by precipitation, filtering, washing and re-dissolution of the rare earths in the solution. After the Product Solution had been treated and adjusted it was then subjected to quaternary ammonium nitrate extraction as described in Example 6. Yttrium was precipitated from the raffinate as the oxalate, dried and calcined at 950%. The resulting oxide was analyzed by mass spectrometrym showing that Gd and Er were present in concentrations of 45 p.p.m. and 25 p.p.m., respectively. Concentrations of other lanthanides were below the detection limit of about 1 p.p.m. The purity of yttrium with respect to lanthanides in this product was thus 99.992 percent which is very acceptable. It is thus seen that if the thiocyanate extraction is carried out first it is necessary to have at least a three-step process of thiocyanate extraction followed by neutralization or removal of the thiocyanate from the aqueous raffinate and then quaternary ammonium nitrate extraction.

It will be understood that the claims are intended to cover all changes and modifications of the preferred embodiments of the invention, herein chosen for the purpose of illustration, which do not constitute departures from the spirit and scope of the invention.

What is claimed is:

1. A process for the separation of yttrium values from the lanthanide elements which comprises the steps of:
   (a) dissolving a product containing lanthanide elements and yttrium values in an acidic aqueous solution;
   (b) contacting said solution with a quaternary ammonium nitrate said quaternary ammonium nitrate being dissolved in an organic solvent which is relatively immiscible with water; and said quaternary ammonium nitrate having the formula

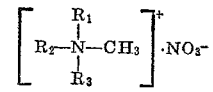

wherein $R_1$, $R_2$, and $R_3$ are saturated hydrocarbon chains with 8–12 carbon atoms;
   (c) whereby a thiocyanate free first aqueous raffinate phase and a first organic extract phase are formed;
   (d) separating said first aqueous raffinate phase from said first organic extract phase and thereafter;
   (e) contacting said aqueous raffinate phase with a thiocyanate having a cation selected from the group consisting of quaternary ammonium compounds, other organic nitrogen containing compounds and organophosphorous compounds, said thiocyanate being dissolved in an organic solvent which is relatively immiscible with water;
   (f) whereby a second aqueous raffinate phase and a second organic extract phase are formed;
   (g) separating said second aqueous raffinate phase from said second organic extract phase; and
   (h) wherein said second aqueous raffinate phase contains substantially pure yttrium values with respect to the lanthanide elements.

2. A process for the separation of yttrium values from the lanthanide elements which comprises the steps of:
   (a) dissolving a product containing lanthanide elements and yttrium values in an acidic aqueous solution;
   (b) contacting said aqueous solution with a thiocyanate having a cation selected from the group consisting of quaternary ammonium compounds, other organic nitrogen containing and organophosphorous compounds, said thiocyanate being in significant amount and being dissolved in an organic solvent which is relatively immiscible with water;
   (c) whereby a first aqueous raffinate phase and a first organic extract phase are formed;

(d) separating said first aqueous raffinate phase from said first organic extract phase;
(e) eliminating the thiocyanate ion from the said first aqueous raffinate phase;
(f) contacting said solution with a quaternary ammonium nitrate said quaternary ammonium nitrate being dissolved in an organic solvent which is relatively immiscible with water; and said quaternary ammonium nitrate having the following formula

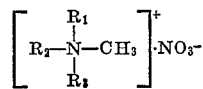

wherein $R_1$, $R_2$, and $R_3$ are saturated hydrocarbon chains with 8–12 carbon atoms;
(g) whereby a thiocyanate free second aqueous raffinate phase and a second organic extract phase are formed;
(h) separating said second aqueous raffinate phase from said second organic extract phase; and
(i) wherein said second aqueous raffinate phase contains substantially pure yttrium values with respect to the lanthanide elements.

3. The process of claim 1 wherein the quaternary ammonium nitrate is methyl-tricapryl-ammonium nitrate.

4. The process of claim 1 wherein the quaternary ammonium nitrate is formed in situ by contacting a quaternary ammonium salt with an easily soluble nitrate salt.

5. The process of claim 1 wherein the quaternary ammonium thiocyanate is formed in situ by contacting a quaternary ammonium salt with an easily soluble thiocyanate salt.

6. The process of claim 2 wherein the quaternary ammonium nitrate is methyl-tricapryl-ammonium nitrate.

7. The process of claim 2 wherein the quaternary ammonium nitrate is formed situ by contacting a quaternary ammonium salt with an easily soluble nitrate salt.

8. The process of claim 2 wherein the quaternary ammonium thiocyanate is formed in situ by contacting a quaternary ammonium salt with an easily soluble thiocyanate salt.

References Cited
UNITED STATES PATENTS

| | | | |
|---|---|---|---|
| 3,223,476 | 12/1965 | Hart | 23—19 R X |
| 3,276,849 | 10/1966 | Moore | 23—19 R X |
| 3,615,171 | 10/1971 | Mason et al. | 23—23 X |
| 3,640,678 | 2/1972 | Trimble et al. | 23—23 X |

FOREIGN PATENTS

| | | | |
|---|---|---|---|
| 545,742 | 9/1957 | Canada | 23—32 |

LELAND A. SEBASTIAN, Primary Examiner

U.S. Cl. X.R.

260—429.2; 423—263